United States Patent
Derby et al.

(10) Patent No.: US 8,990,281 B2
(45) Date of Patent: Mar. 24, 2015

(54) TECHNIQUES FOR IMPROVING THE EFFICIENCY OF MIXED RADIX FAST FOURIER TRANSFORM

(71) Applicant: International Business Machines Corporation, Armonk, NY (US)

(72) Inventors: Jeffrey H. Derby, Chapel Hill, NC (US); Vadim Sheinin, Yorktown Heights, NY (US); Hangu Yeo, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/624,469

(22) Filed: Sep. 21, 2012

(65) Prior Publication Data

US 2014/0089366 A1    Mar. 27, 2014

(51) Int. Cl.
G06F 17/14    (2006.01)
G06F 9/38    (2006.01)
H04L 27/26    (2006.01)

(52) U.S. Cl.
CPC ............ G06F 17/142 (2013.01); G06F 9/3895 (2013.01); H04L 27/263 (2013.01)
USPC ........................................................ 708/404

(58) Field of Classification Search
CPC ..... G06F 17/142; G06F 7/768; G06F 17/141; H04L 27/265; H04L 27/2628
USPC ........................................ 708/404, 408, 409
See application file for complete search history.

(56) References Cited

U.S. PATENT DOCUMENTS

| | | | |
|---|---|---|---|
| 7,720,897 B2 | 5/2010 | Buchert et al. | |
| 7,870,177 B2 | 1/2011 | Saha et al. | |
| 2005/0015420 A1* | 1/2005 | Gibb et al. | 708/404 |
| 2005/0102342 A1 | 5/2005 | Greene | |
| 2008/0155003 A1* | 6/2008 | Lai et al. | 708/404 |
| 2009/0313314 A1 | 12/2009 | Mundarath et al. | |

(Continued)

FOREIGN PATENT DOCUMENTS

JP    2010016831 A    1/2010

OTHER PUBLICATIONS

De Burgwal et al. in "Non-power-of-two FFTs: Exploring the Flexibility of the Montium TP," International Journal of Reconfigurable Computing, vol. 2009, Article ID 678045.

(Continued)

Primary Examiner — Tan V. Mai
(74) Attorney, Agent, or Firm — Jennifer R. Davis; Michael J. Chang, LLC (57) ABSTRACT

Techniques for implementing mixed-radix FFT on SIMD vector processors efficiently for the latest standard in wireless communication technology by dynamically reordering stages are provided. In one aspect, a mixed-radix FFT implementation method for vector processors is provided which includes the following steps. Input data is decomposed into segments of factors based on a size of the input data, wherein the decomposing is performed in one or more stages, and wherein at each of the stages the input data is processed in blocks using one or more FFT butterfly computations for each of the blocks. The stages in which the decomposing is performed are reordered to insure complete utilization of the vector processors. The butterfly computations for one or more of the blocks are reordered to insure that the input data have memory addresses which are next to each other and contiguous.

18 Claims, 11 Drawing Sheets

(56) References Cited

U.S. PATENT DOCUMENTS

2010/0017452 A1* 1/2010 Lee et al. ............... 708/404
2010/0174769 A1 7/2010 Modlin et al.
2010/0179978 A1 7/2010 Halvarsson
2011/0099216 A1 4/2011 Sun et al.

OTHER PUBLICATIONS

Clive Temperton in "Self-sorting in place fast Fourier transforms," SIAM J. Sci. Stat. Comput., vol. 12, Jul. 1991, pp. 808-823.

* cited by examiner

| Size | Decomposition | Size | Decomposition | Size | Decomposition | Size | Decomposition |
|---|---|---|---|---|---|---|---|
| 16 | 4x4 | 48 | 4x4x3 | 288 | 4x4x3x3x2 | 720 | 5x4x4x3x3 |
| 32 | 4x4x2 | 60 | 5x4x3 | 300 | 5x5x4x3 | 768 | 4x4x4x4x3 |
| 64 | 4x4x4 | 72 | 4x3x3x2 | 324 | 4x3x3x3x3 | 864 | 4x4x3x3x3x2 |
| 128 | 4x4x4x2 | 96 | 4x4x3x2 | 360 | 5x4x3x3x2 | 900 | 5x5x4x3x3 |
| 256 | 4x4x4x4 | 108 | 4x3x3x3 | 384 | 4x4x4x3x2 | 960 | 5x4x4x4x3 |
| 512 | 4x4x4x4x2 | 120 | 4x5x3x2 | 432 | 4x4x3x3x3 | 972 | 4x3x3x3x3x3 |
| 1024 | 4x4x4x4x4 | 144 | 4x4x3x3 | 480 | 5x4x4x3x2 | 1080 | 5x4x3x3x3x2 |
| 2048 | 4x4x4x4x4x2 | 180 | 4x3x3x5 | 540 | 5x4x3x3x3 | 1152 | 4x4x4x3x3x2 |
| 12 | 4x3 | 192 | 4x4x4x3 | 576 | 4x4x4x3x3 | 1200 | 5x5x4x4x3 |
| 24 | 4x3x2 | 216 | 4x3x3x3x2 | 600 | 5x5x4x3x2 | 1536 | 4x4x4x4x3x2 |
| 36 | 4x3x3 | 240 | 5x4x4x3 | 648 | 4x3x3x3x2 | | |

```
for ( stage = 0; stage < nStages; stage++) {
    for (block=0; block < nBlocks; block++) {
        for (butterfly=0; butterfly < nButterfly; butterfly++) {
            fft_2(); fft_3(); fft_4(); fft_5();
        }
    }
}
```

FIG. 4A

FFT size = 8

| stage = 0 | stage = 1 | stage = 2 |
| nBlock = 1 | nBlock = 2*1 = 2 | nBlock = 2*2 = 4 |
| nButterfly = 4 | nButterfly = 2 | nButterfly = 1 |
| Factor: 2 | Factor: 2 | Factor: 2 |

Process four butterflies concurrently using 8-way SIMD
```
for ( stage = 0; stage < nStage; stage++) {
    for (block=0; block < nBlock; block++) {
        for (butterfly=0; butterfly < nButterfly; butterfly+=4) {
            fftvec_2(); fftvec_3(); fftvec_4(); fftvec_5();
        }
    }
}
```

Example : Radix-4

16x2x4 = 128 bits

| | | | | |
|---|---|---|---|---|
| Input 1 | base | base+stride | base+2*stride | base+3*stride |
| Input 2 | base+1 | base+stride+1 | base+2*stride+1 | base+3*stride+1 |
| Input 3 | base+2 | base+stride+2 | base+2*stride+2 | base+3*stride+2 |
| Input 4 | base+3 | base+stride+3 | base+2*stride+3 | base+3*stride+3 |

FIG. 5A

```
for ( stage = 0; stage < nStages; stage++) {
    for (block=0; block < nBlocks; block+=4) {
        for (butterfly=0; butterfly < nButterfly; butterfly++) {
            vec_fft_2(); vec_fft_3(); vec_fft_4(); vec_fft_5();
        }
    }
}
```

Radix-2

FIG. 6B

Radix-3

FIG. 6C

Radix-4

FIG. 6D

Radix-5

FIG. 7

FIG. 8 : 8-way SIMD implementation of 1200 point FFT

Stage 0 : Input data shuffling (Radix-4).

RANDOM ORDERING

| Stage | nBlock | nButterfly | Kernel |
|---|---|---|---|
| 1 | 1 | 240 | radix-5 |
| 2 | 5 | 48 | radix-5 |
| 3 | 25 | 12 | radix-4 |
| 4 | 100 | 3 | radix-4 |
| 5 | 400 | 1 | radix-3 |

FIG. 9

PROPOSED ORDERING SCHEME

| Stage | nBlock | nButterfly | Kernel |
|---|---|---|---|
| 1 | 1 | 300 | radix-4 |
| 2 | 4 | 75 | radix-4 |
| 3 | 16 | 15 | radix-5 |
| 4 | 80 | 3 | radix-5 |
| 5 | 400 | 1 | radix-3 |

FIG. 10

FIG. 11 : 16-way SIMD implementation of 1200 point FFT

Stage 0 : Input data shuffling (Radix-4).

FIG. 12 : 16-way SIMD implementation of 1200 point FFT

Stage 1 : Input data shuffling (Radix-4).

| | 16x2x8 = 256 bits | | | | | | | |
|---|---|---|---|---|---|---|---|---|
| Input 1 | base | base+1 | base+2 | base+3 | base+4 | base+5 | base+6 | base+7 |
| Input 2 | base+8 | base+9 | base+10 | base+11 | base+12 | base+13 | base+14 | base+15 |
| Input 3 | base+16 | base+17 | base+18 | base+19 | base+20 | base+21 | base+22 | base+23 |
| Input 4 | base+24 | base+25 | base+26 | base+27 | base+28 | base+29 | base+30 | base+31 |

▼

| Input 1 | base | base+1 | base+2 | base+3 | base+16 | base+17 | base+18 | base+19 |
|---|---|---|---|---|---|---|---|---|
| Input 2 | base+4 | base+5 | base+6 | base+7 | base+20 | base+21 | base+22 | base+23 |
| Input 3 | base+8 | base+9 | base+10 | base+11 | base+24 | base+25 | base+26 | base+27 |
| Input 4 | base+12 | base+13 | base+14 | base+15 | base+28 | base+29 | base+30 | base+31 |

FIG. 13 : 16-way SIMD implementation of 1200 point FFT

Stage 2 : Radix-5 FFT (no input sample shuffling needed)

In scalar code : nBlock = 16 and nButterfly = 15.

There are 16 blocks, and each block has three radix-5 butterflies.

The stride is nBlock (=16).

| input1 | input2 | input3 | input4 | input5 | input1 | input2 | input3 | input4 | input5 | input1 | input2 | input3 | input4 | input5 |
|---|---|---|---|---|---|---|---|---|---|---|---|---|---|---|
| 0-15 | 16-31 | 32-47 | 48-63 | 64-79 | 80-95 | 96-111 | 112-127 | 128-143 | 144-159 | 160-175 | 176-191 | 192-207 | 208-223 | 224-239 |
| 240-255 | 256-271 | 272-287 | 288-303 | 304-319 | 320-335 | 336-351 | 352-367 | 368-383 | 384-399 | 400-415 | 416-431 | 432-447 | 448-463 | 464-479 |
| 480-495 | 496-511 | 512-527 | 528-543 | 544-559 | 560-575 | 576-591 | 592-607 | 608-623 | 624-639 | 640-655 | 656-671 | 672-687 | 688-703 | 704-719 |
| 720-735 | 736-751 | 752-767 | 768-783 | 784-799 | 800-815 | 816-831 | 832-847 | 848-863 | 864-879 | 880-895 | 896-911 | 912-927 | 928-943 | 944-959 |
| 960-975 | 976-991 | 992-1007 | 1008-1023 | 1024-1039 | 1040-1055 | 1056-1071 | 1072-1087 | 1088-1103 | 1104-1119 | 1120-1135 | 1136-1151 | 1152-1167 | 1168-1183 | 1184-1199 |

In vector code : With 16-way SIMD, eight Radix-5 butterflies are processed simultaneously.

Thirty ( = 240/8) 16-way SIMD Radix-5 butterflies.

Input samples within three input vector arrays ($N^{th}$ 16-way SIMD radix-5 butterfly)

base_1=8*N, base_2=16+base_1, base_3=16+base_2, base_4=16+base_3, and base_5=16+base_4

FIG. 14 : 16-way SIMD implementation of 1200 point FFT

Stage 3 : Radix-5 FFT (no input sample shuffling needed)

In scalar code : nBlock = 80 and nButterfly = 3.

There are 80 blocks, and each block has three radix-5 butterflies.

The stride is nBlock (=80).

| input1 | input2 | input3 | input4 | input5 | input1 | input2 | input3 | input4 | input5 | input1 | input2 | input3 | input4 | input5 |
|---|---|---|---|---|---|---|---|---|---|---|---|---|---|---|
| 0-79 | 80-159 | 160-239 | 240-319 | 320-399 | 400-479 | 480-559 | 560-639 | 640-719 | 720-799 | 800-879 | 880-959 | 960-1039 | 1040-1119 | 1120-1199 |

In vector code : With 16-way SIMD, eight Radix-5 butterflies are processed simultaneously.

Thirty ( = 240/8) 16-way SIMD Radix-5 butterflies.

Input samples within three input vector arrays ($N^{th}$ 16-way SIMD radix-5 butterfly)

base_1=8*N, base_2=80+base_1, base_3=80+base_2, base_4=80+base_3, and base_5=80+base_4

| | | | | | | | | |
|---|---|---|---|---|---|---|---|---|
| Input 1 | base_1 | base_1+1 | base_1+2 | base_1+3 | base_1+4 | base_1+5 | base_1+6 | base_1+7 |
| Input 2 | base_2 | base_2+1 | base_2+2 | base_2+3 | base_2+4 | base_2+5 | base_2+6 | base_2+7 |
| Input 3 | base_3 | base_3+1 | base_3+2 | base_3+3 | base_3+4 | base_3+5 | base_3+6 | base_3+7 |
| Input 4 | base_4 | base_4+1 | base_4+2 | base_4+3 | base_4+4 | base_4+5 | base_4+6 | base_4+7 |
| Input 5 | base_5 | base_5+1 | base_5+2 | base_5+3 | base_5+4 | base_5+5 | base_5+6 | base_5+7 |

FIG. 15 : 16-way SIMD implementation of 1200 point FFT

Stage 4 : Radix-3 FFT (no input sample shuffling needed)

In scalar code : nBlock = 400 and nButterfly = 1.

There are 400 blocks, and each block has one radix-3 butterfly.

The stride is nBlock (=400).

| Input 1 | | | | | Input 2 | | | | | Input 3 | | | | |
|---|---|---|---|---|---|---|---|---|---|---|---|---|---|---|
| 0 | 1 | 2 | .... | 398 | 399 | 400 | 401 | 402 | .... | 798 | 799 | 800 | 801 | 802 | .... | 1198 | 1199 |

In vector code : With 16-way SIMD, eight Radix-3 butterflies are processed simultaneously.

Fifty ( = 400/8) 16-way SIMD Radix-3 butterflies.

Input samples within three input vector arrays ($N^{th}$ 16-way SIMD radix-3 butterfly)

base_1 = 8 * N, base_2 = 400 + base_1, base_3 = 400 + base_2;

| | | | | | | | | |
|---|---|---|---|---|---|---|---|---|
| Input 1 | base_1 | base_1+1 | base_1+2 | base_1+3 | base_1+4 | base_1+5 | base_1+6 | base_1+7 |
| Input 2 | base_2 | base_2+1 | base_2+2 | base_2+3 | base_2+4 | base_2+5 | base_2+6 | base_2+7 |
| Input 3 | base_3 | base_3+1 | base_3+2 | base_3+3 | base_3+4 | base_3+5 | base_3+6 | base_3+7 |

TECHNIQUES FOR IMPROVING THE EFFICIENCY OF MIXED RADIX FAST FOURIER TRANSFORM

FIELD OF THE INVENTION

The present invention relates to mixed-radix Fast Fourier Transform (FFT) and more particularly, to techniques for implementing mixed-radix FFT on Single Instruction Multiple Data (SIMD) vector processors efficiently for the latest standard in wireless communication technology such as 4G Long Term Evolution (LTE) by dynamically reordering stages to attain 100% utilization of the vector engine.

BACKGROUND OF THE INVENTION

The 4G Long Term Evolution (LTE) is the latest standard in wireless communication technology. The Orthogonal Frequency Division Multiplexing (OFDM) is a multi-carrier modulation method in LTE to have better bandwidth efficiency, and one of the most computationally intensive operations of OFDM is Fast Fourier Transform (FFT). The LTE defines various sizes of FFTs which are required at both basestations and terminals to transmit and to receive signals up to 20 MHz bandwidth. The use of large size FFTs in the physical layer consumes a significant percentage of processing power of the processor.

Mixed-radix FFT was proposed to decompose and factor the large data length into shorter lengths such as 2, 3, 4 or 5, and uses the small sized FFT modules to compute the original large sized input data length more efficiently. While there have been efforts to find efficient ways to parallelize the mixed-radix FFT implementation, the efforts were mainly focused on FFT sizes of power of 2 or power of 4, and none have been able to restructure the process efficiently to fit better on target Single Instruction Multiple Data (SIMD) vector processors for any composite sized FFT which is factored into factors such as 2, 3, 4 and 5.

Thus, techniques for implementing mixed-radix FFT on SIMD vector processors efficiently for the latest standard in wireless communication technology such as 4G LTE would be desirable.

SUMMARY OF THE INVENTION

The present invention provides techniques for implementing mixed-radix Fast Fourier Transform (FFT) on Single Instruction Multiple Data (SIMD) vector processors efficiently for the latest standard in wireless communication technology such as 4G Long Term Evolution (LTE) by dynamically reordering stages to attain 100% utilization of the vector engine. In one aspect of the invention, a mixed-radix FFT implementation method for vector processors is provided. The method includes the following steps. Input data is decomposed into segments of factors based on a size of the input data, wherein the decomposing is performed in one or more stages, and wherein at each of the stages the input data is processed in blocks using one or more FFT butterfly computations for each of the blocks. The stages in which the decomposing is performed are reordered to insure complete utilization of the vector processors. The butterfly computations for one or more of the blocks are reordered to insure that the input data have memory addresses which are next to each other and contiguous.

A more complete understanding of the present invention, as well as further features and advantages of the present invention, will be obtained by reference to the following detailed description and drawings.

BRIEF DESCRIPTION OF THE DRAWINGS

FIG. 14 is a diagram illustrating the exemplary 16-way SIMD implementation of an FFT of size 1200 at stage 3 (Radix-5 FFT) according to an embodiment of the present invention;

FIG. 15 is a diagram illustrating the exemplary 16-way SIMD implementation of an FFT of size 1200 at stage 4 (Radix-5 FFT) according to an embodiment of the present invention;

DETAILED DESCRIPTION OF PREFERRED EMBODIMENTS

Provided herein are techniques for efficient implementation of mixed-radix Fast Fourier Transform (FFT) on Single Instruction Multiple Data (SIMD) vector processors for the latest standard in wireless communication technology such as 4G Long Term Evolution (LTE). The present techniques guarantee 100% utilization of the vector engine by dynamically reordering stages. The present techniques also guarantee that the input data samples within each input vector register are contiguous in memory.

FFT decomposes a set of data to be transformed into smaller data sets, and then decomposes the smaller data sets into even smaller data sets, and so on. The mixed radix FFT works on composite sized FFT. Namely, the mixed radix FFT is designed to decompose and process input data samples into small sets and transform the input samples using small size radices. Although it is common that an input sample length is a power of two and factorized into multiple stages which is implemented with radix-2 FFT butterflies, with mixed radix FFT the sizes of FFT are not limited to sizes which are a power of two.

The FFT sizes defined in 4G LTE are factored into a series of stages which use radix-2, radix-3, radix-4 or radix-5 "butterflies" as basic building blocks. The term "butterfly" is derived from the shape of the data flow diagram in a radix-2 FFT (which resembles a butterfly) and herein generally refers to any computation wherein a data set is decomposed into a series of smaller data sets to be transformed and/or wherein smaller data sets are combined into a larger data set. The radix-4 butterfly is designed because it has a fewer number of stages and number of operations than two consecutive stages using radix-2 butterflies.

Figure 1:
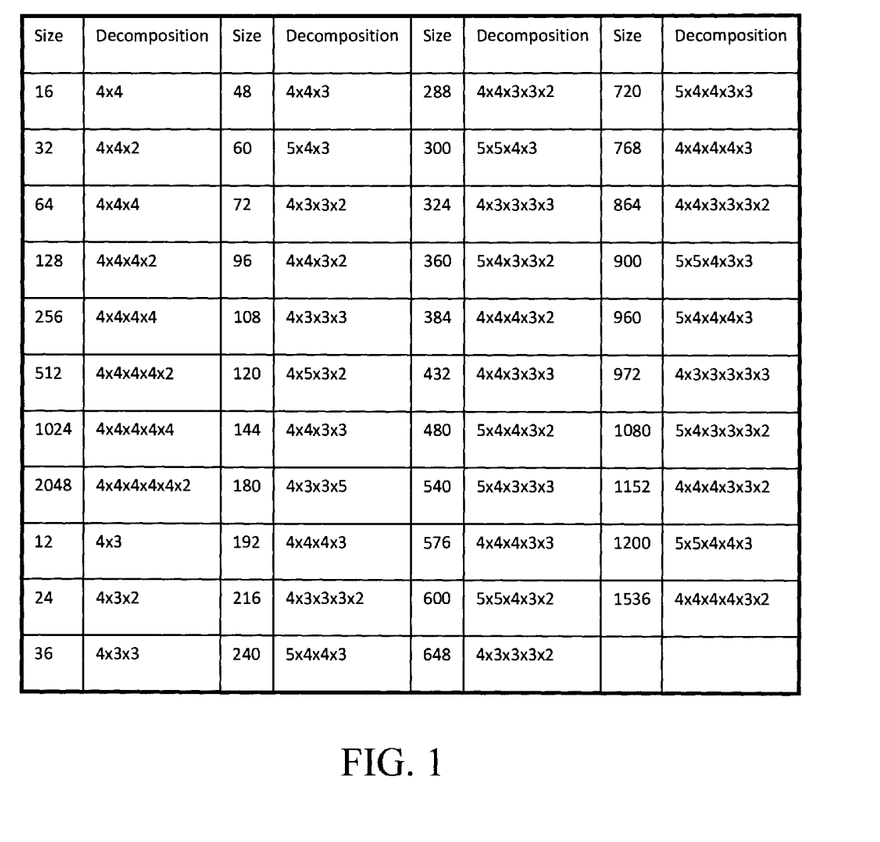
FIG. 1 is a diagram illustrating the Fast Fourier Transform (FFT) sizes that are used in 4G Long Term Evolution (LTE) according to an embodiment of the present invention.

FIG. 1 is a diagram illustrating the FFT sizes that are used in 4G LTE. As shown in FIG. 1, large sized FFTs are broken down (decomposed) into segments of factors. For instance, an FFT with a size of 32 is decomposed into the factors 4×4×2. This decomposition involves three steps or stages. By comparison, an FFT with a size of 16 is decomposed into the factors 4×4. See FIG. 1. This decomposition involves two steps or stages.

Figure 2:
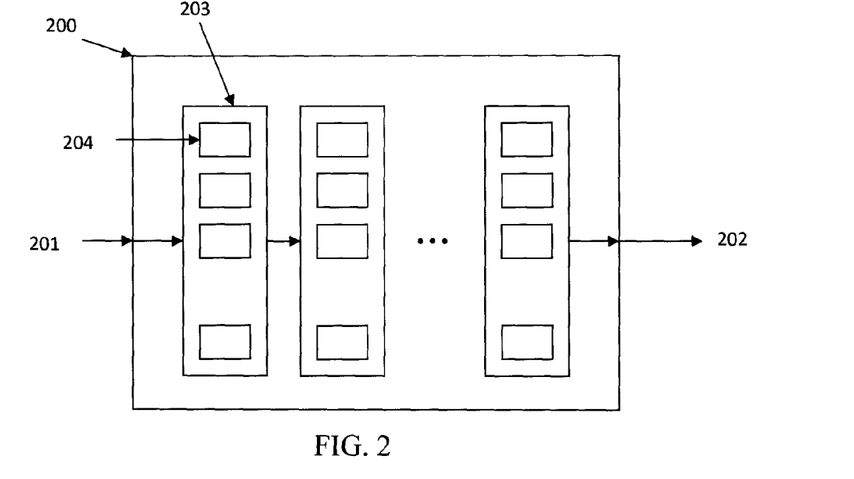
FIG. 2 is a schematic representation of a mixed-radix FFT using multiple stages according to an embodiment of the present invention.

FIG. 2 is a schematic representation of mixed-radix FFT using multiple stages 200. In conventional scenarios, the FFT operates on a finite sequence of complex numbers in a 32 bit floating point 201 and generates an output sequence in 32 bit floating point 202. See FIG. 2. Each stage 203 is designed to handle each factor obtained by decomposition of original composite size of FFT, and each stage contains various number of FFT butterflies 204. With the instant techniques, a mixed-radix FFT using multiple stages (such as that shown in FIG. 2) is employed, however the present techniques permit multiple FFT butterflies to be processed at once thereby increasing the efficiency of the process.

Figure 3:
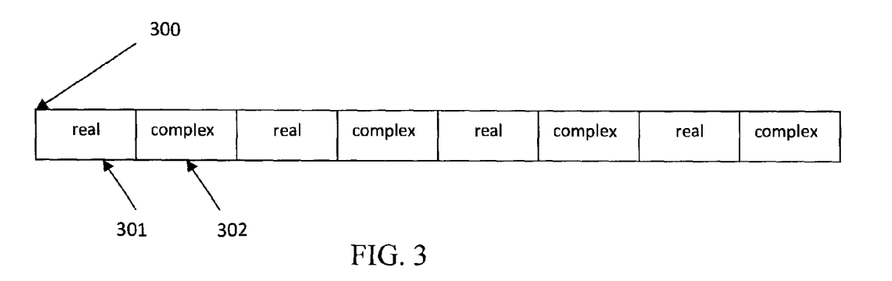
FIG. 3 is a schematic representation showing that for a 128 bit vector register with an 8-way Single Instruction Multiple Data (SIMD) unit, four complex input data samples can be packed in a vector register having 16 bit real number and 16 bit complex number interleaved according to an embodiment of the present invention.

Namely, the present techniques are designed to implement FFT efficiently on SIMD vector processors (e.g., 8-way SIMD or 16-way SIMD). In the proposed method, the 32 bit floating point complex numbers are converted to 16 bit integer numbers to pack more input samples in vector registers. As shown in FIG. 3, for a 128 bit vector register with an 8-way SIMD unit 300, four complex input data samples are packed in a vector register having 16 bit real number 301 and 16 bit complex number 302 interleaved. Hence, in the vector case, four data samples (four butterflies) are processed concurrently which is twice the width of floating point processing.

Figure 4A:
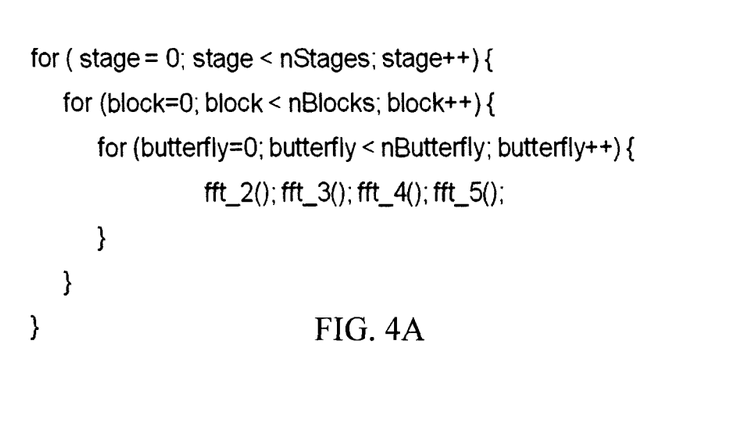
FIG. 4A is pseudo code of the FFT process which has triple nested loop structure on input, block and butterfly indices according to an embodiment of the present invention.
Figure 4B:
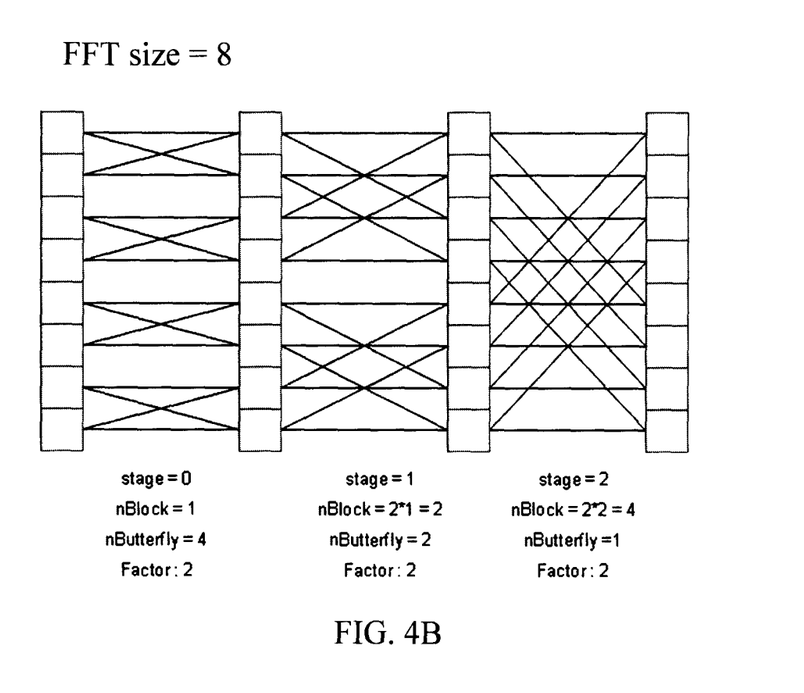
FIG. 4B shows the structure of a three stage eight-point FFT process using radix-2 butterflies according to an embodiment of the present invention.
Figure 4C:
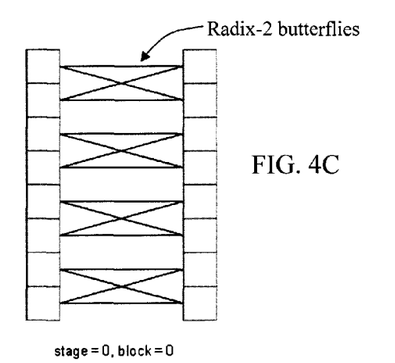
FIG. 4C shows the first stage of the eight-point FFT process illustrated in FIG. 4B according to an embodiment of the present invention.
Figure 4D:
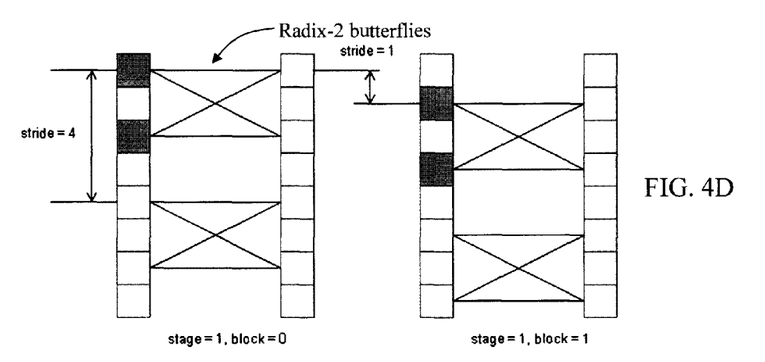
FIG. 4D shows the second stage of the eight-point FFT process illustrated in FIG. 4B according to an embodiment of the present invention.
Figure 4E:
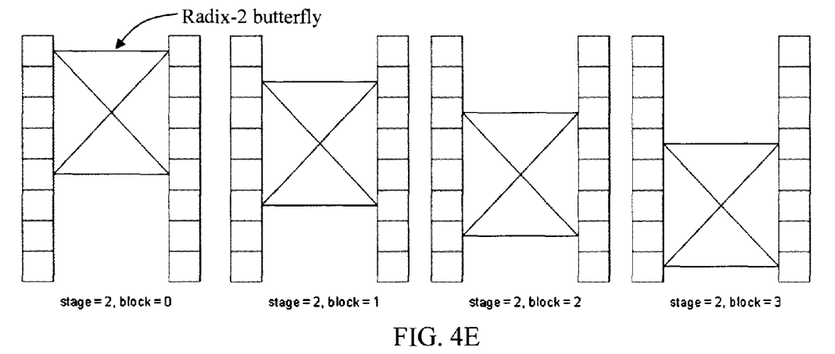
FIG. 4E shows the third stage of the eight-point FFT process illustrated in FIG. 4B according to an embodiment of the present invention.

The mixed-radix FFT process has a triple nested loop structure on stage index, block index and butterfly index as shown in FIG. 4A. Each stage is designed to handle each factor obtained by the decomposition of the original composite FFT size. The number of blocks (nBlock) varies at each stage, and each block contains various numbers of butterflies at each stage, too. For example, nBlock is initialized to one at the first stage, and the value of nBlock of the following stages are calculated by multiplying the number of blocks of the previous stage and a factor of the previous stage, i.e. nBlock(stage+1)=nBlock(stage)*factor(stage). The number of butterflies at each stage (nButterfly) is calculated by nButterfly(stage)=FFT_SIZE/(nBlock(stage)*factor(stage)). FIGS. 4B-E illustrate FFT butterflies at each block index within each stage when the FFT size eight is decomposed into three consecutive stages 2×2×2. As shown in FIG. 4C, the first stage is composed of a single block (nBlock=1) which contains four radix-2 butterflies. As shown in FIG. 4D, the second stage is composed of two blocks (nBlock=2), and each block contains two radix-2 butterflies respectively. It is notable in FIG. 4D that the stride between two consecutive butterflies within the same block is four whereas the stride between the first butterflies in two consecutive blocks (one from each block) is one. Also, the four data samples which are shaded are next to each other when the stride is equal to one. Hence, the inputs samples to the two butterflies are neighboring each other. As shown in FIG. 4E, the third stage is composed of four blocks (nBlock=4), and each block contains a single radix-2 butterfly.

Figure 5A:
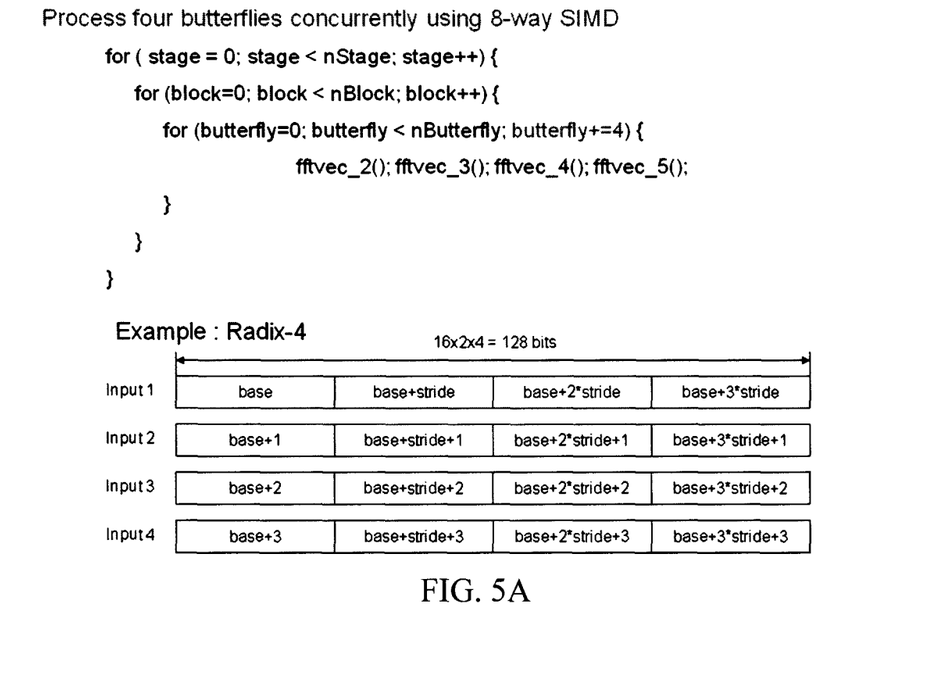
FIG. 5A is a diagram illustrating the exemplary scenario wherein four data sample sets (i.e., four FFT butterflies) are processed concurrently using an 8-way SIMD according to an embodiment of the present invention.
Figure 5B:
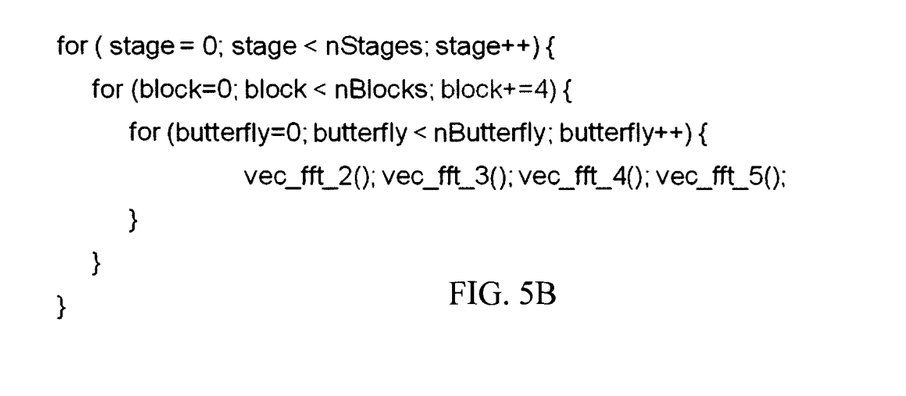
FIG. 5B is pseudo code of the FFT process with proposed reordering scheme within a stage according to an embodiment of the present invention.

FIG. 5A is a diagram illustrating the exemplary scenario wherein four data sample sets (i.e., four FFT butterflies) are processed concurrently using an 8-way SIMD. In the example shown in FIG. 5A, a radix-4 butterfly scenario is being used. As provided above, a radix-4 butterfly design is favorable because it has fewer number of stages and number of operations than radix-2 butterflies. As shown in FIG. 5A, there are four data sample inputs (labeled "Input 1"-"Input 4"). FIG. 5B is pseudo code of the FFT methodology with proposed reordering scheme within a stage.

Figure 6A:
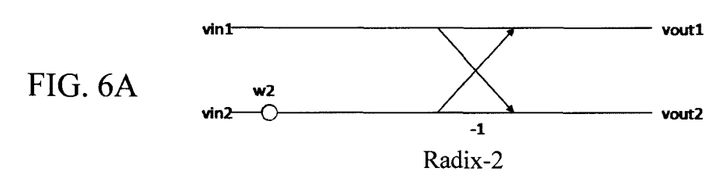
FIG. 6A is a schematic diagram illustrating a radix-2 butterfly according to an embodiment of the present invention.
Figure 6B:
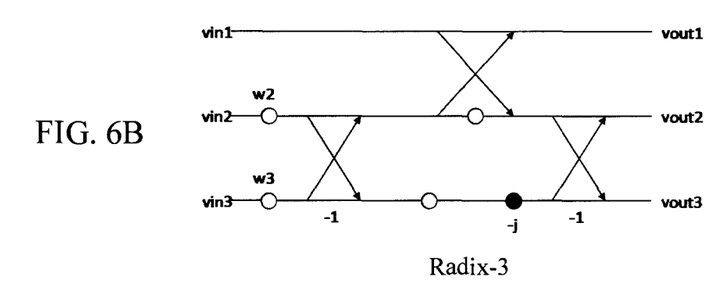
FIG. 6B is a schematic diagram illustrating a radix-3 butterfly according to an embodiment of the present invention.
Figure 6C:
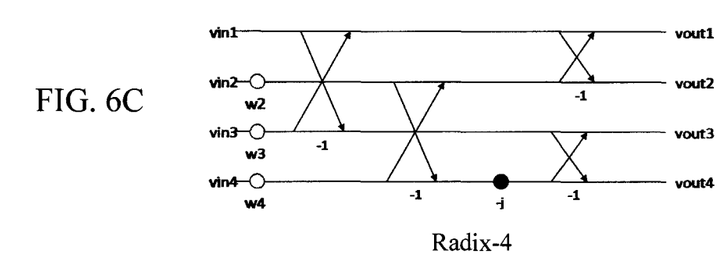
FIG. 6C is a schematic diagram illustrating a radix-4 butterfly according to an embodiment of the present invention.
Figure 6D:
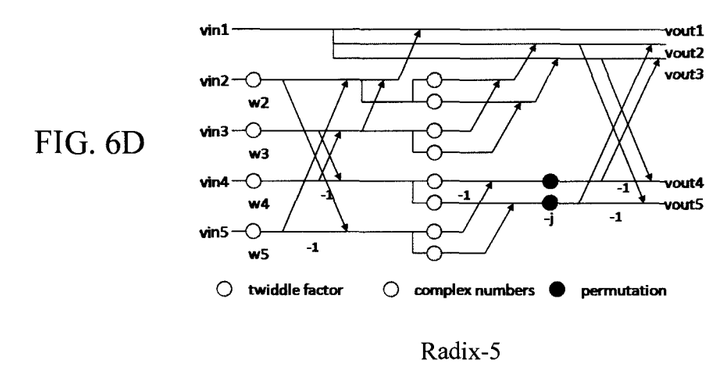
FIG. 6D is a schematic diagram illustrating a radix-5 butterfly according to an embodiment of the present invention.

FIGS. 6A-D are schematic diagrams illustrating radix-2, radix-3, radix-4 or radix-5 butterflies, respectively. For example, as shown in FIG. 6C, if the FFT butterfly is a radix-4 butterfly, then each data set is composed of 4 data samples.

Figure 7:
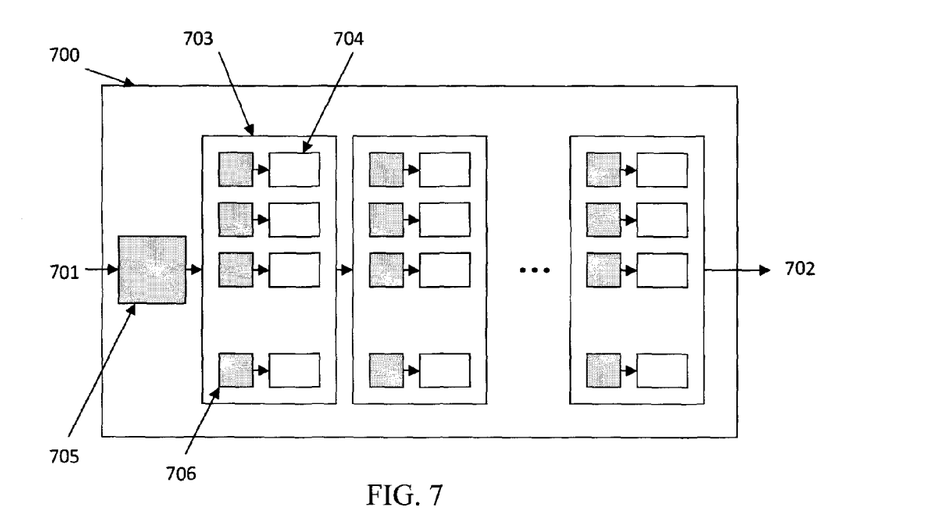
FIG. 7 is a schematic representation of mixed-radix FFT which, according to the present techniques, incorporates one or more reordering units according to an embodiment of the present invention.

FIG. 7 is a schematic representation of mixed-radix FFT 700 which, according to the present techniques, incorporates one or more reordering units 705 and 706. The input 701 to the mixed-radix FFT 700 is a finite sequence of 16 bit integer numbers and a sequence of 16 bit integer numbers are generated as an output 702. Although the 128 bit vector processor can process up to four FFT butterflies 704 concurrently with the input data format depicted in FIG. 3 (described above), the utilization of SIMD engine drops dramatically if the stages 703 are not ordered carefully. In a worst case scenario, the 128 bit vector processor processes only one FFT butterfly 704, which (without the present reordering scenario) would occur in many cases.

Unlike the random stage ordering scheme, the present techniques include reordering unit 705 that dynamically reorders the stages 703 based on decomposed factors. Reordering unit 705 guarantees 100% utilization of vector processor. See, for example, FIGS. 9 and 10, described below.

Another feature of the present techniques is a second reordering unit 706 that reorders the processing of each butterfly 704 at each stage 703. In most cases, the input data samples to each FFT butterfly 704 are sparsely located in the memory, and it is inefficient to pack input samples into vector registers before the FFT processing starts. The reordering unit 706 will be described in detail below. It is notable that the techniques described herein, i.e., 1) reordering the stages and 2) reordering the butterflies at each stage—so as to permit more efficient data processing, can be performed together or independently—as the situation warrants. Thus, for instance, according to the present techniques a mixed-radix FFT can be implemented having both a reordering unit 705 for reordering the stages, and a reordering unit 706 for reordering the butterflies at each stage. However, using either technique independently will also increase the efficiency of the mixed-radix FFT and such scenarios are anticipated herein.

When the processor supports 8-way (128 bit) or 16-way (256 bit) SIMD vectors, the proposed unit can process 4 FFT modules/butterflies (8-way) or 8 FFT modules/butterflies (16-way) concurrently. Using the 8-way SIMD as an example, since four FFT butterflies can be processed concurrently, the unit requires 4 input data sets (one input data set for each FFT butterfly, and each data set is composed of 4 data samples if the FFT butterfly is radix-4 butterfly). See for example, FIG. 6C, described above.

As depicted in FIG. 5A (described above), if the four butterflies within a block are processed concurrently, the unit has to bring 16 data samples whose addresses in the memory are depicted in FIG. 5A. For example, the first 128 bit input vector needs to be filled with four input data samples whose addresses in memory are (base, base+stride, base+2*stride, base+3*stride), and the second 128 bit input vector needs to be filled with four input data samples whose addresses in memory are (base+1, base+stride+1, base+2*stride+1, base+3*stride+1), and so on. There is no guarantee that the value of the stride is one, and it means that the addresses of those 16 input data samples are not next to each other unless the stride is one. See for example, FIG. 4D, described above.

Figure 8:
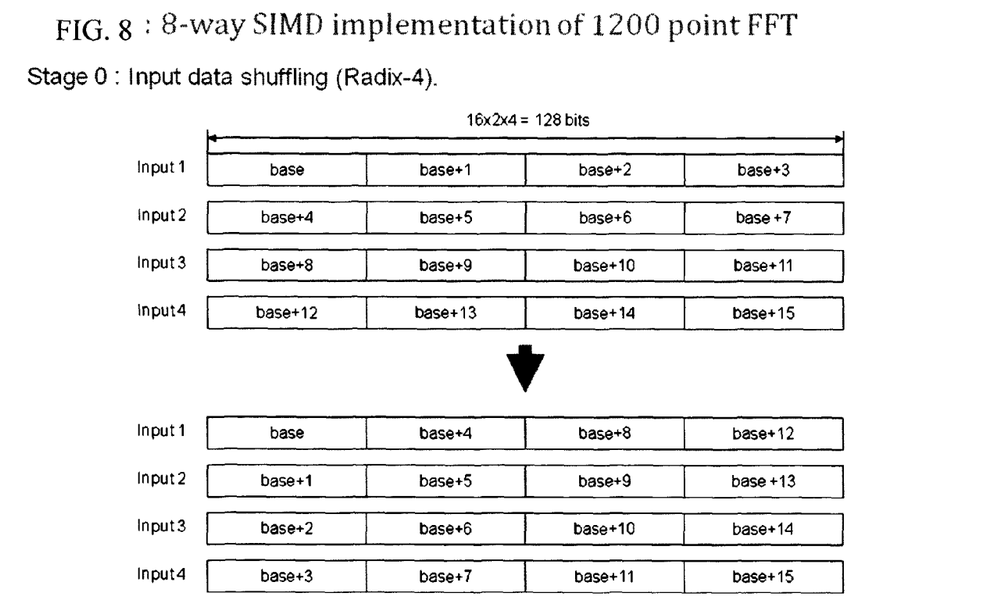
FIG. 8 is a diagram illustrating an exemplary 8-way SIMD implementation of an FFT of size 1200 which involves reordering at stage 0 according to an embodiment of the present invention.

On the other hand, the present reordering scheme which processes four butterflies one butterfly from each block (see FIG. 4D, described above) makes the stride=1, and all of the sixteen input samples have memory addresses which are next to each other (sixteen addresses starting from base address). The pseudo code which processes the proposed reordering scheme is depicted in FIG. 5B. With the present reordering scheme, four butterflies (one from each block instead of four from a single block) are chosen to be processed concurrently. This means that input samples to input vector registers (64 byte for 8-way SIMD and 128 byte for 16-way SIMD) can be moved from memory to cache with simple cache line copy. By comparison, when the value of the stride is not one, there are offsets between input sample addresses in the memory, and the input samples need to be packed into vector registers manually to remove the unwanted samples between input samples in the memory. FIG. 8 shows how the input data samples are shuffled at the first stage where the value of nBlock is one. Once the sixteen samples are loaded into four input vector registers of the 8-way SIMD, shuffle instructions are needed to rearrange the samples within the input vectors (see FIG. 8). The vector shuffle instruction is defined as a SIMD instruction to move data samples from the source vector registers to the destination vector registers, and the data samples within the vector registers are permuted by the shuffle instruction.

According to an exemplary embodiment, for an 8-way SIMD, 100% vector utilization can be obtained by processing a radix-4 stage at the very first stage. By doing this the values of nBlock are multiples of four from the second to the last stage, and four butterflies (one from each block) can be processed concurrently. See, for example, FIG. 10, described below. In this example, at the first stage (Stage 1) the value of nBlock may be one at this first stage (see FIG. 10), and the 100% vector utilization can be obtained by processing four butterflies from the same block concurrently with extra shuffling instructions to permute data samples within the vector registers.

Similarly, in the context of a 16-way SIMD, 100% vector utilization can be obtained, for example, by processing two consecutive radix-4 stages or radix-4 followed by radix-2 at the first two stages. By doing this, the values of nBlock are multiples of sixteen or multiples of eight from the third to the last stage, and eight butterflies (one from each block) can be processed concurrently. In this example, the value of nBlock is one at the first stage and four at the second stage, and the 100% vector utilization can be obtained by processing four butterflies from the same block concurrently. Although all the data samples were loaded using simple cache copy, the order of data samples is not in a correct order. Data sample order within the vector register can be fixed with shuffle instruction.

Figure 9:
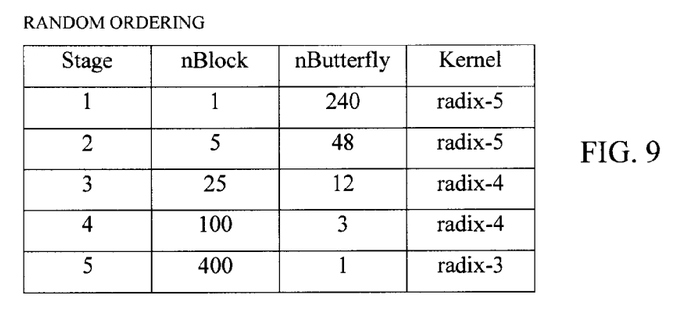
FIG. 9 is a table illustrating a random ordering scheme in an exemplary scenario where the FFT size is 1200 according to an embodiment of the present invention.
Figure 10:
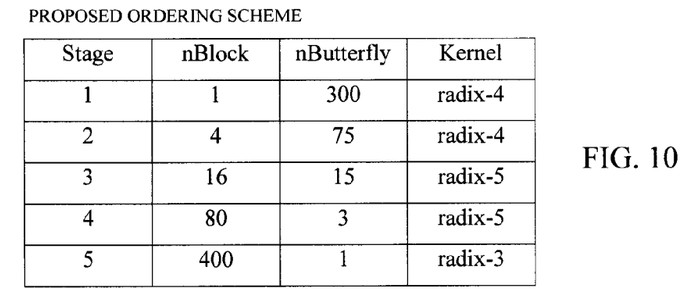
FIG. 10 is a table illustrating the present ordering scheme for an 8-way SIMD in an exemplary scenario where the FFT size is 1200 according to an embodiment of the present invention.

The present reordering scenario in the context of an exemplary 8-way SIMD implementation of an FFT of size 1200 is further illustrated by way of reference to FIGS. 9 and 10. FIG. 9 is a table illustrating a random ordering scheme in an exemplary scenario where the FFT size is 1200. As shown in FIG. 9, if the random ordering scheme was used, this would result in data processing inefficiencies. For instance, in the second stage, there are 5 blocks. Thus the second stage in the random ordered scheme in the context of an 8-way SIMD would involve processing four blocks and then a single block, which is inefficient use of the 8-way SIMD capabilities. By contrast, FIG. 10 is a table illustrating the present ordering scheme where the FFT size is 1200, and the number of blocks (nBlock) is always a multiple of four (from stage 2 to stage 5) which allows the proposed method to have 100% utilization of the vector processor (in this example an 8-way SIMD). Thus, at every stage (stage 2 through stage 5) there are four input data samples to process.

For the first stage where nBlock is one, shuffling procedures among data in vector registers are needed to reorder the data in the registers. As described above, the reordering unit at each stage (based, for example, on the reordering unit 706 of FIG. 7, described above) guarantees that the input data samples to each FFT butterfly are contiguous in memory, and there is no need to access to sparsely located input samples.

Figure 11:
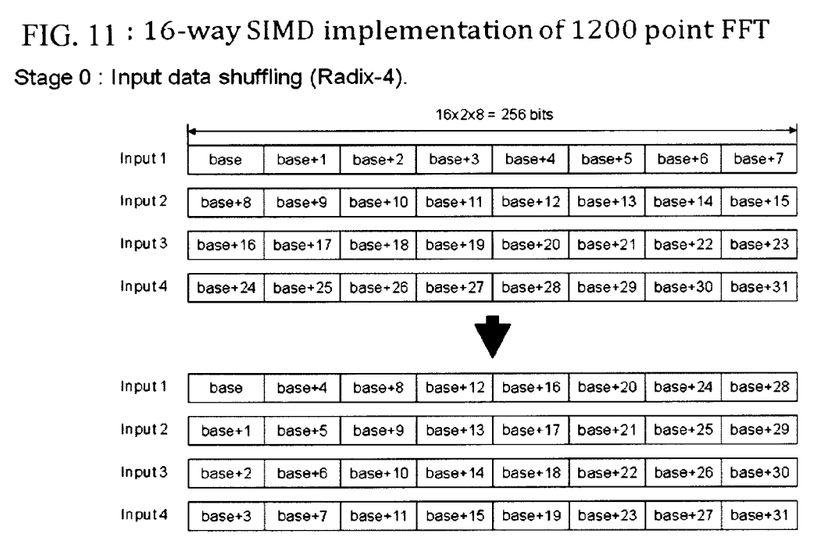
FIG. 11 is a diagram illustrating an exemplary 16-way SIMD implementation of an FFT of size 1200 which involves reordering at stage 0 (Radix-4 FFT) according to an embodiment of the present invention.
Figure 12:
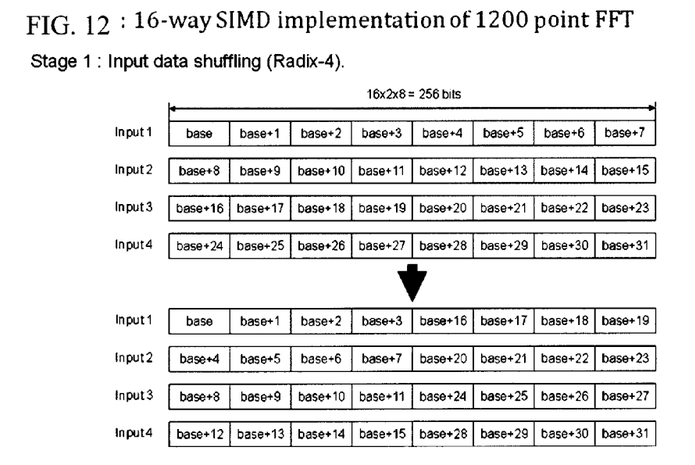
FIG. 12 is a diagram illustrating the exemplary 16-way SIMD implementation of an FFT of size 1200 at stage 1 (Radix-4 FFT) according to an embodiment of the present invention.

As shown in FIGS. 11-15, the present techniques are verified for a 16-way SIMD case when, for example, the FFT size is 1200. FIGS. 11 and 12 show that the first two stages of the 16-way SIMD are similar to the 8-way radix-4 case (the first stage) where the value of nBlock is not a multiple of four. The values of nBlock at the first two stages are one and four which are not multiples of eight. As described above, eight butterflies can be processed concurrently with 16-way SIMD and the data samples in the input vector registers need to be reordered using shuffle instruction after being read from the memory into the vector registers. It is shown in FIG. 11 and FIG. 12 that all of the thirty-two input samples have memory addresses which are next to each other (thirty-two addresses starting from base address). This means that thirty-two input samples can be read from the memory using cache copy operation. However, extra shuffling instructions are needed at the first two stages because the butterflies are being processed in a different order. Since nBlock values are not a multiple of eight, 100% vector processor utilization cannot be achieved with the proposed reordering scheme. To fully utilize the vector processor in the first two stages, the butterflies are processed block by block which introduces extra shuffling process as depicted in FIGS. 11 and 12.

Figure 13:
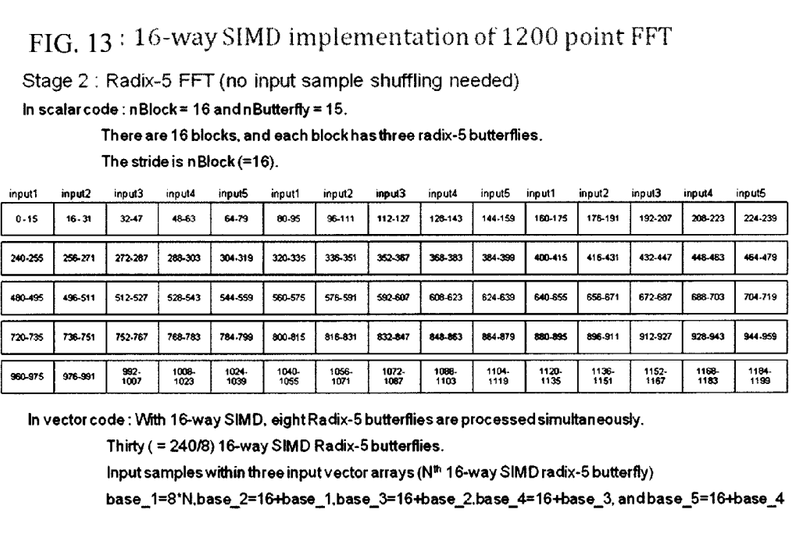
FIG. 13 is a diagram illustrating the exemplary 16-way SIMD implementation of an FFT of size 1200 at stage 2 (Radix-5 FFT) according to an embodiment of the present invention.

FIG. 13 is a diagram illustrating the address of input data samples to radix-5 butterflies for 16-way SIMD at stage 2. In this case, there is no reordering/shuffling of the input data samples needed in this stage. The numbers in the boxes show the offsets of the input samples from the base address. FIG. 13 shows that all eighty input data samples in five 256-bit input vector registers processed concurrently with eight radix-5 FFT butterflies are contiguous in memory. Since the input data samples (complex number) are composed of two numbers (real and imaginary numbers which are interleaved), the actual number of data processed concurrently is 80 (2*5*8), which is (number of data per sample)*(number of inputs to radix-5 FFT)*(number of input samples in 256 bit input vector register). No reordering/shuffling of the input data samples is needed at stage 3 or stage 4. See FIGS. 14 and 15, respectively.

Figure 16:
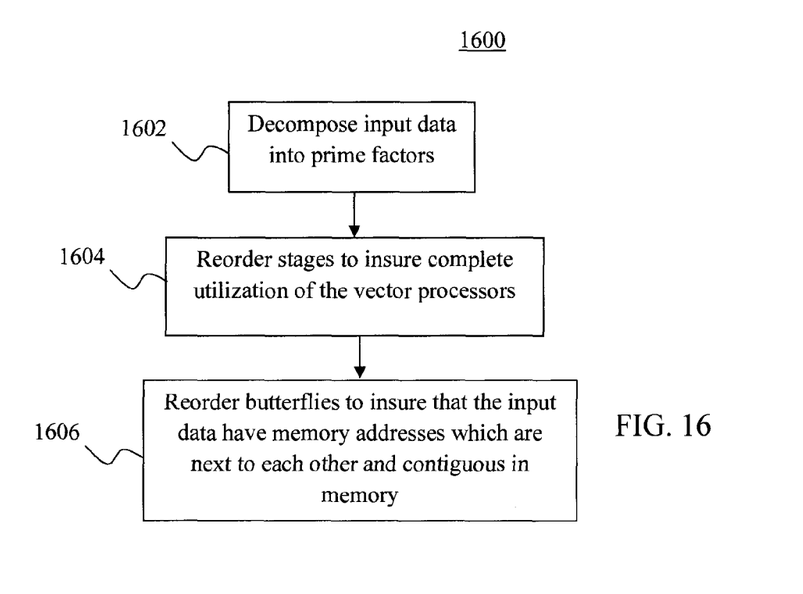
FIG. 16 is a diagram illustrating an exemplary methodology for implementing a mixed-radix FFT for vector processors according to an embodiment of the present invention.

Based on the above description, FIG. 16 is a diagram illustrating an exemplary methodology 1600 for implementing a mixed-radix FFT for vector processors. As shown in FIG. 16, in step 1602, the input data is decomposed into segments of factors (e.g., 2, 3, 4, and/or 5) based on a size of the input data. This process is illustrated in FIG. 1, for example, in the context of FFT sizes found in 4G LTE. See above. As provided above, this decomposing is performed in one or more stages. See FIG. 1 where, for example, an FFT with a size of 32 is decomposed into the factors 4×4×2 which involves three steps or stages. Based on the above description of the mixed-radix FFT process, it is shown that at each stage the input data is processed in blocks using one or more FFT butterfly computations (e.g., radix-2, radix-3, radix-4, and/or radix-5—see for example FIGS. 6A-D, described above) for each of the blocks. The number of blocks (nBlock) varies at each stage, and each block contains various numbers of butterflies at each stage as described above. See, for instance, FIG. 9 where it is shown that Stage 2 in that example involves 5 (=1*5) blocks and 48 (=1200/(5*5)) butterflies in each block. Because the value of nBlock is initially set to one at the first stage, the nBlock=1 at the first stage, and nBlock=2, 3, 4 or 5 (less than 8) at the second stage. Hence, a processing order of butterflies at the first stage in 8-way SIMD and at the first two stages in 16-way SIMD should be designed differently.

As provided above, if the process was performed in a random order (compare for example FIGS. 9 and 10, both described above), then underutilization of the vector processors would likely be the result, with the worst case scenario being where only one FFT butterfly is processed at a given time. By comparison, the present techniques advantageously provide a reordering/shuffling scenario where in step 1604 the stages in which the decomposing is performed are reordered to insure complete utilization of the vector processors. As provided above, complete utilization of the vector processors means that there is guaranteed 100% vector process utilization. Namely, in order to insure/guarantee that the vector processor is being used to its full processing capacity, according to an exemplary embodiment wherein the vector processors comprise an 8-way SIMD unit, step 1604 is performed such that at each of the stages a number of the blocks comprises a value that is a multiple of four. Since the number of blocks of a certain stage (nBlock(n+1)) is calculated by multiplying the number of blocks of the previous stage (nBlock(n)) and a factor of the previous stage (factor(n)), the step 1604 reorders stages so that all of the stages corresponding to a factor of four are processed before processing other stages corresponding to factors such as 2, 3 or 5. This guarantees that all of the remaining stages have nBlock values which are multiples of four. The nBlock and nButterfly values of each stage are recalculated according to the new processing order in step 1604. It is notable that, as described above, the initial stage might not have complete utilization. Using the example in FIG. 10 for instance, at Stage 1 there is only 1 block. This initial stage (always the first stage for 8-way SIMD and the first two stages for 16-way SIMD) which is composed of a single block is processed differently. The vector processor processes four butterflies all from the same block concurrently, and the input data in the vector register are shuffled before being fed to FFT modules. Reordering after Stage 1 for 8-way SIMD, however, will insure that Stages 2-5 are performed with complete 100% utilization of the vector processors.

It was also demonstrated above that the present techniques are applicable in the same manner to a 16-way SIMD unit. In that case, for instance, step 1604 is performed such that at each of the stages a number of the blocks comprises a value that is a multiple of eight.

Further, in step 1606, the butterfly computations for one or more of the blocks are reordered to insure that the input data have memory addresses which are next to each other and contiguous in memory. See for example FIG. 8, described above, which shows in the 8-way SIMD example how the input data is reordered/shuffled so that all of the sixteen input samples have memory addresses which are next to each other. The same scenario was investigated above with regard to the 16-way SIMD example. As provided above, according to an exemplary embodiment, the input data comprises a 16 bit fixed point real point part and a 16 bit fixed point complex part.

Figure 17:
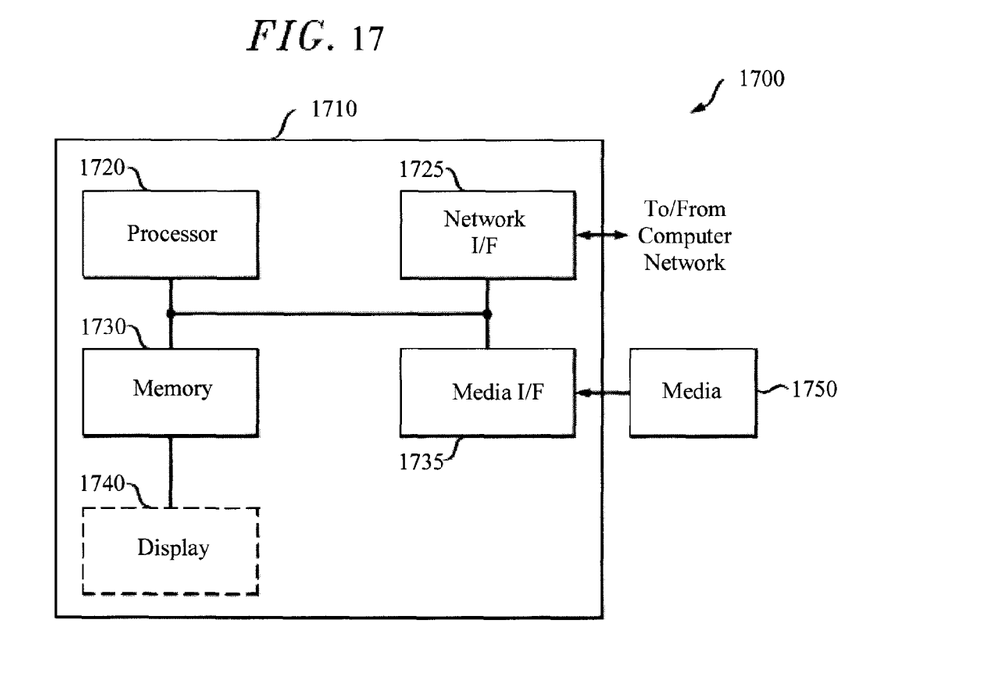
FIG. 17 is a diagram illustrating an exemplary apparatus for performing one or more of the methodologies presented herein according to an embodiment of the present invention.

Turning now to FIG. 17, a block diagram is shown of an apparatus 1700 for implementing one or more of the methodologies presented herein. By way of example only, apparatus 1700 can be configured to implement one or more of the steps of methodology 1600 of FIG. 16 for implementing a mixed-radix FFT for vector processors.

Apparatus 1700 comprises a computer system 1710 and removable media 1750. Computer system 1710 comprises a processor device 1720, a network interface 1725, a memory 1730, a media interface 1735 and an optional display 1740. Network interface 1725 allows computer system 1710 to connect to a network, while media interface 1735 allows computer system 1710 to interact with media, such as a hard drive or removable media 1750.

As is known in the art, the methods and apparatus discussed herein may be distributed as an article of manufacture that itself comprises a machine-readable medium containing one or more programs which when executed implement embodiments of the present invention. For instance, when apparatus 1700 is configured to implement one or more of the steps of methodology 1600 the machine-readable medium may contain a program configured to decompose input data into segments of factors based on a size of the input data, wherein the decomposing is performed in one or more stages, and wherein at each of the stages the input data is processed in blocks using one or more FFT butterfly computations for each of the blocks; reorder the stages in which the decomposing is performed to insure complete utilization of the vector processors; and reorder the butterfly computations for one or more of the blocks to insure that the input data have memory addresses which are next to each other and contiguous.

The machine-readable medium may be a recordable medium (e.g., floppy disks, hard drive, optical disks such as removable media 1750, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1720 can be configured to implement the methods, steps, and functions disclosed herein. The memory 1730 could be distributed or local and the processor device 1720 could be distributed or singular. The memory 1730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1720. With this definition, information on a network, accessible through network interface 1725, is still within memory 1730 because the processor device 1720 can retrieve the information from the network. It should be noted that each distributed processor that makes up processor device 1720 generally contains its own addressable memory space. It should also be noted that some or all of computer system 1710 can be incorporated into an application-specific or general-use integrated circuit.

Optional display 1740 is any type of display suitable for interacting with a human user of apparatus 1700. Generally, display 1740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A mixed-radix Fast Fourier Transform (FFT) implementation method for vector processors, the method comprising the steps of:
    decomposing input data into segments of factors based on a size of the input data, wherein the decomposing is performed in one or more stages, and wherein at each of the stages the input data is processed in blocks using one or more FFT butterfly computations for each of the blocks;
    reordering the stages in which the decomposing is performed to insure complete utilization of the vector processors, wherein the step of reordering the stages in which the decomposing is performed is carried out using a reordering unit configured to reorder the stages; and
    reordering the butterfly computations for one or more of the blocks to insure that the input data have memory addresses which are next to each other and contiguous, wherein the step of reordering the butterfly computations for one or more of the blocks is carried out using one or more other reordering units configured to reorder the butterfly computations at each of the stages.

2. The method of claim 1, wherein the factors comprise one or more of 2, 3, 4, and 5.

3. The method of claim 1, wherein the step of reordering the stages is performed such that at each of the stages, other than at a first one of the stages, a number of the blocks comprises a value that is a multiple of four.

4. The method of claim 3, wherein the vector processors comprise an 8-way Single Instruction Multiple Data (SIMD) unit.

5. The method of claim 4, wherein at the first one of the stages the input data is processed using radix-4 butterfly computations such that at each of the stages, other than at the first one of the stages, a number of the blocks comprises a value that is a multiple of four.

6. The method of claim 5, wherein at each of the stages, other than the first one of the stages, the input data is processed using four of the butterfly computations, being performed concurrently, with one of the butterfly computations being performed for each of the blocks.

7. The method of claim 4, wherein at the first one of the stages there is a single block.

8. The method of claim 7, wherein at the first one of the stages the input data is processed using four of the butterfly computations, being performed concurrently for the single block.

9. The method of claim 1, wherein the step of reordering the stages is performed such that at each of the stages, other than at a first one and a second one of the stages, a number of the blocks comprises a value that is a multiple of eight.

10. The method of claim 9, wherein the vector processors comprise a 16-way SIMD unit.

11. The method of claim 10, wherein the input data is processed using radix-4 butterfly computations at both the first one of the stages and the second one of the stages such that at each of the stages, other than at the first one and the second one of the stages, a number of the blocks comprises a value that is a multiple of sixteen or eight.

12. The method of claim 11, wherein at each of the stages, other than the first one of the stages and the second one of the stages, the input data is processed using eight of the butterfly computations, being performed concurrently, with one of the butterfly computations being performed for each of the blocks.

13. The method of claim 10, wherein the input data is processed using radix-4 butterfly computations at the first one of the stages and radix-2 butterfly computations at the second one of the stages such that at each of the stages, other than at the first one and the second one of the stages, a number of the blocks comprises a value that is a multiple of sixteen or eight.

14. The method of claim 13, wherein at each of the stages, other than the first one of the stages and the second one of the stages, the input data is processed using eight of the butterfly computations, being performed concurrently, with one of the butterfly computations being performed for each of the blocks.

15. The method of claim 10, wherein at the first one of the stages the number of the blocks has a value that is equal to one such that there is a single block, and at the second one of the stages the number of blocks has a value that is equal to four.

16. The method of claim 15, wherein at the first one of the stages the input data is processed using four of the butterfly computations, being performed concurrently for the single block.

17. The method of claim 1, wherein the butterfly computations comprise one or more of radix-2, radix-3, radix-4 and radix-5 butterfly computations.

18. The method of claim 1, wherein the input data comprises a 16 bit fixed point real point part and a 16 bit fixed point complex part.

* * * * *